(12) United States Patent
Debrauwer et al.

(10) Patent No.: US 11,629,256 B2
(45) Date of Patent: Apr. 18, 2023

(54) THERMOCHROMIC PIGMENT COMPOSITION

(71) Applicant: SOCIETE BIC, Clichy (FR)

(72) Inventors: Christelle Debrauwer, Saint Germain sur Morin (FR); Anne-Lise Damiano, Lagny sur Marne (FR); Alexander Bourque, Montevrain (FR)

(73) Assignee: Societe Bic, Clichy (FR)

( * ) Notice: Subject to any disclaimer, the term of this patent is extended or adjusted under 35 U.S.C. 154(b) by 597 days.

(21) Appl. No.: 16/486,778

(22) PCT Filed: Feb. 16, 2018

(86) PCT No.: PCT/FR2018/050374
§ 371 (c)(1),
(2) Date: Aug. 16, 2019

(87) PCT Pub. No.: WO2018/150146
PCT Pub. Date: Aug. 23, 2018

(65) Prior Publication Data
US 2019/0382585 A1    Dec. 19, 2019

(30) Foreign Application Priority Data

Feb. 17, 2017   (FR) ...................................... 1751293

(51) Int. Cl.
C09B 11/08 (2006.01)
C09B 67/02 (2006.01)
C09D 11/50 (2014.01)

(52) U.S. Cl.
CPC .......... *C09B 11/08* (2013.01); *C09B 67/0097* (2013.01); *C09D 11/50* (2013.01)

(58) Field of Classification Search
CPC ..... C09B 11/08; C09B 67/0097; C09D 11/02; C09D 11/50
See application file for complete search history.

(56) References Cited

U.S. PATENT DOCUMENTS 4,094,855 A    6/1978  Spivack
4,523,207 A *  6/1985  Lewis .................... B41M 5/395
                                                    156/234

(Continued)

FOREIGN PATENT DOCUMENTS

CN    105308150 A    2/2016
CN    105566736 A    5/2016

(Continued)

OTHER PUBLICATIONS

Pastor et al., "Medium-sized Heterocycles: synthesis of a 2,10-bis (alkoxycarbonl)-substituted 6-oxo-12H-dibenzo (d,g)(1,3,2) dioxaphosphocin", Journal of Heterocyclic Chemi, Wiley-Blackwell Publishing. Inc. US., vol. 28. Jan. 1, 1991, pp. 1561-1564.

(Continued)

*Primary Examiner* — Bijan Ahvazi
(74) *Attorney, Agent, or Firm* — Ruggiero, McAllister & McMahon LLC

(57) ABSTRACT

A thermochromic pigment composition comprising: (A) at least one electron-donor organic dye compound, (B) at least one electron-acceptor compound, and (C) at least one compound. The thermochromic pigment composition is microencapsulated and is useable in writing instruments.

16 Claims, 1 Drawing Sheet

(56) References Cited

U.S. PATENT DOCUMENTS

| | | | | |
|---|---|---|---|---|
| 5,417,748 | A * | 5/1995 | Kawashima | C09D 11/17 106/31.19 |
| 5,876,492 | A | 3/1999 | Malhotra et al. | |
| 9,695,329 | B2 | 7/2017 | Ono | |
| 2002/0063244 | A1 | 5/2002 | Nakashima et al. | |
| 2011/0021678 | A1* | 1/2011 | Isozaki | C08L 69/00 524/174 |
| 2012/0202034 | A1* | 8/2012 | Morizur | C08K 5/524 428/220 |
| 2012/0227623 | A1* | 9/2012 | Sekiguchi | C09D 11/38 106/31.32 |
| 2015/0090159 | A1 | 4/2015 | Wang et al. | |
| 2016/0089920 | A1 | 3/2016 | Philippe et al. | |
| 2016/0333210 | A1* | 11/2016 | Wang | C08K 5/09 |
| 2019/0382585 | A1 | 12/2019 | Debrauwer et al. | |

FOREIGN PATENT DOCUMENTS

| | | |
|---|---|---|
| EP | 2626398 A1 | 8/2013 |
| EP | 3009493 A1 | 4/2016 |
| EP | 3103853 A1 | 12/2016 |
| JP | H11166123 A | 6/1999 |
| JP | 2002053853 A | 2/2002 |
| WO | 2003060001 A2 | 7/2003 |
| WO | 2006002714 A | 1/2006 |
| WO | 2006044337 A | 4/2006 |
| WO | 2013115800 A1 | 8/2013 |
| WO | 2015168389 A1 | 11/2015 |
| WO | 2016198784 A1 | 12/2016 |

OTHER PUBLICATIONS

Pastor et al. "Nucleophilic subsitution at silicon: Synthesis of sterically-hindered bis (2,6-di-t-butylaryloxy) silanes", Journal of Organometallic Chemistry, Elsevier Sequoia S.A., vol. 328. No. 3. Jul. 1, 1987, pp. 263-274.

International Search Report for corresponding international application PCT/FR2018/050374, dated Apr. 25, 2018, 7 pages.

Chinese Office Action for related Chinese application No. 201880007865.7, 9 pages, dated Nov. 11, 2020.

Japanese Office Action for related Japanese application No. 2019-537252, 5 pages, dated Oct. 11, 2021.

Japanese Office Action for related Japanese application No. 2019-537252, 5 pages, dated Mar. 9, 2022.

* cited by examiner

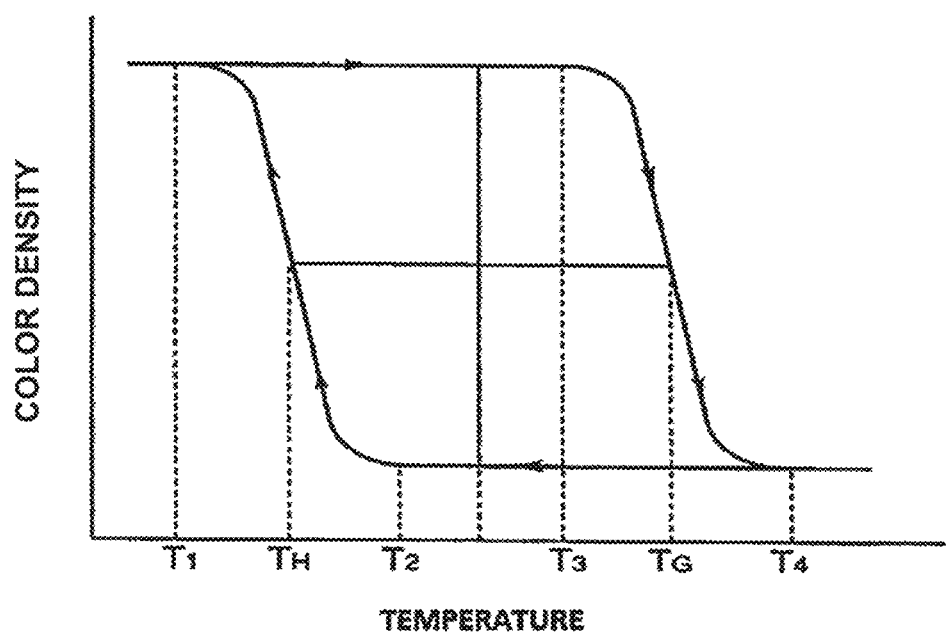

THERMOCHROMIC PIGMENT COMPOSITION

CROSS REFERENCE TO RELATED APPLICATION

This application is a National Stage Application of International Application No. PCT/FR2018/050374, filed on Feb. 16, 2018, now published as WO2018/150146 and which claims priority to French Application No. FR1751293, filed Feb. 17, 2017, the entire contents of which is incorporated herein by reference.

FIELD

The present disclosure relates to a novel thermochromic pigment composition comprising a compound of formula (I) as reaction medium. The present disclosure likewise relates to microencapsulated thermochromic pigments comprising a thermochromic pigment composition according to the disclosure, to ink compositions comprising such microencapsulated thermochromic pigments, and finally to writing instruments comprising such ink compositions.

BACKGROUND

Thermochromic pigment compositions present reversible decoloration properties relating to a temperature change. These compositions are used when an ink marking requires repeated erasure.

The thermochromic effect of an ink works due to the association of the three following compounds:

(A) at least one electron-donor organic dye or leuco dye compound,
(B) at least one electron-acceptor or color developer compound, and
(C) at least one compound serving as a reaction medium, capable of bringing about a reversible electron-acceptance/donation reaction that can be attributed to compounds (A) and (B) or a temperature change regulation agent.

Temperature changes reversibly cause the coloration or decoloration of inks. Thus, an increase in temperature will cause the erasure of the ink, while cooling will cause its appearance. These changes follow the details in FIG. 1. In FIG. 1, the initial color disappearance temperature of the ink is T3, that at which the color of the ink has totally disappeared is T4, and $T_G$ is the medium temperature between T3 and T4. Conversely, the initial color reappearance temperature of the ink is T1, and $T_H$ is the temperature between T1 and T2. The range between ($T_G$) and ($T_H$) is called the color change hysteresis range ($\Delta H$).

SUMMARY

The disclosure involves a new thermochromic pigment composition comprising as compound (C) at least one compound of the formula (I) presenting optimal fusion and crystallization temperature ranges corresponding to the decoloration and recoloration temperatures of these compounds, respectively. The compound of formula (I) from the disclosure presents numerous advantages to be used as a temperature change regulating agent in thermochromic pigment compositions: it has remarkable hysteresis characteristics and an extremely high color contrast between the colored state and the decolored state. The thermochromic pigment composition according to the disclosure likewise presents antioxidant properties and/or resistance to UV rays, these properties being intrinsic to the compound of formula (I), without there being a need to add antioxidant and/or anti-UV compounds to the composition.

BRIEF DESCRIPTION OF THE DRAWINGS

Other characteristics and advantages will readily appear from the following description, provided as a non-limitative example, and of the accompanying drawings.

In the drawings:

FIG. 1 is a schematic of temperature ranges according to Prior Art thermochromic pigment compositions.

DETAILED DESCRIPTION

According to an aspect of the disclosure, the technical objective is to provide a thermochromic pigment composition comprising:

(A) at least one electron-donor organic dye compound,
(B) at least one electron-acceptor compound, and
(C) at least one compound responding to the following formula (I):

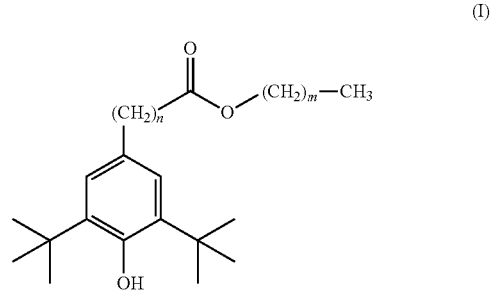

(I)

wherein:
n=0-2, and
m=5-19, preferably m=7-19, and even more preferably m=11-17.

Compounds of the formula (I) are known from the prior art for their use as antioxidants or UV stabilizers, but they have never been described for their use as a compound (C), i.e. as a reaction medium capable of bringing about a reversible electron-acceptance/donation reaction between an electron-donor organic dye compound (A) and an electron-acceptor compound (B), in thermochromic pigment compositions. It is absolutely surprising that the Inventors discovered that the compound of formula (I) according to the disclosure defined above presents optimal fusion and crystallization temperatures allowing its use as compound (C) or a temperature change regulating agent in thermochromic pigment compositions.

Thus, the disclosure likewise relates to the use of a compound responding to the following formula (I):

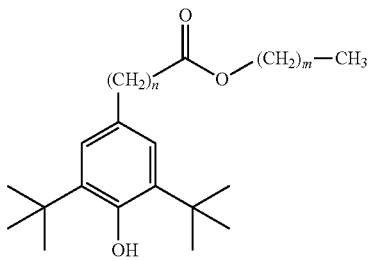

(I)

and wherein:
n=0-2, and
m=5-19, preferably m=7-19, and even more preferably m=11-17 as a reaction medium capable of bringing about a reversible electron-acceptance/donation reaction between an electron-donor organic dye compound (A) and an electron-acceptor compound (B) of a thermochromic pigment composition.

The compound of formula (I) present in the thermochromic pigment composition according to the disclosure is chosen from among one of the following compounds:

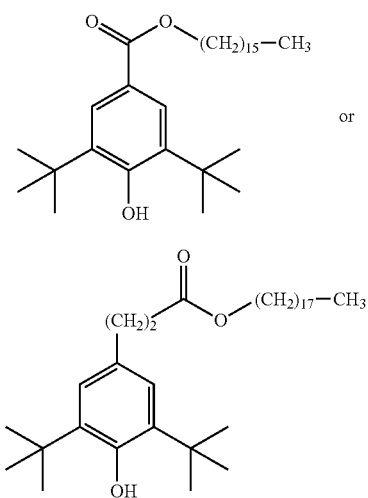

(1)

or (2)

The weight ratios of the compounds (A), (B) and (C) are influenced by the nature and concentration of each of these compounds.

The weight ratio of the electron-donor organic dye compound (A) may vary from 1 to 10%, preferably from 1 to 6% and even more preferably from 2 to 4% by weight in relation to the total weight of the thermochromic pigment compound.

The weight ratio of the electron-acceptor compound (B) may vary from 1 to 20%, preferably from 1 to 14% and even more preferably from 4 to 10% by weight in relation to the total weight of the thermochromic pigment compound.

The weight ratio of the compound (C) of formula (I) playing the role of a reaction medium may vary from 70 to 98%, preferably from 80 to 98% and even more preferably from 86 to 94% by weight in relation to the total weight of the thermochromic pigment compound.

Thus, the thermochromic pigment composition according to the disclosure may comprise:

(A) from 1 to 10%, preferably from 1 to 6% and even more preferably from 2 to 4% by weight of at least one electron-donor organic dye compound,
(B) from 1 to 20%, preferably from 1 to 14% and even more preferably from 4 to 10% by weight of at least one electron-acceptor compound, and
(C) from 70 to 98%, preferably from 80 to 98% and even more preferably from 86 to 94% by weight by weight of at least one compound responding to the formula (I).

According to an aspect, the thermochromic pigment composition of the disclosure comprises:

(A) from 2 to 4% by weight of at least one electron-donor organic dye compound,
(B) from 4 to 10% by weight of at least one electron-acceptor compound, and
(C) from 86 to 94% by weight of at least one compound responding to the formula (I).

The thermochromic pigment composition according to the disclosure has a color change hysteresis range (ΔH) after encapsulation ranging from 20 to 80° C., preferably from 30 to 80° C. and even more preferably from 40 to 70° C.

As an electron-donor organic dye compound (A), a non-limiting list may include classically known compounds such as diphenylmethane phthalides, phenylindolyl phthalides, diphenylmethane azaphthalides, phenylindolyl azaphthalides, fluorans, styrylquinolines and diazarhodamine lactones, examples of these compounds being presented below.

The electron-donor organic dye compound (A) can thus be chosen from among 3-(4-diethylamino-2-ethoxyphenyl)-3-(1-ethyl-2-methylindol-3-yl)-4-azaphthalide (Blue 63, CAS no.: 69898-40-4), 3,3-bis(p-dimethylaminophenyl)-6-dimethylaminophthalate (CAS no.: 1552-42-7), 2'-chloro-6'-(diethylamino)-3'-methylfluorane (CAS no.: 21121-62-0), 6'-(diethylamino)-1',3'-dimethylfluorane (CAS no.: 21934-68-9), 6'-(diethylamino)-1',3'-dimethylfluorane (CAS no.: 21934-68-9), 2-chloro-6-(dimethylamino)fluorine (CAS no.: 26567-23-7), 3-diethylaminobenzofluorane (CAS no.: 26628-47-7), 3',6'-bis(diethylamino)-2-(4-nitrophenyl)spiro[isoindole-1,9'-xanthene]-3-one (CAS no.: 29199-09-5), 2-phenylamino-3-methyl-6-diethylaminofluorane (CAS no.: 29512-49-0), 2'-(dibenzylamino)-6'-(diethylamino)fluorine (CAS no.: 34372-72-0), 2-(2,4-dimethylphenylamimo)-3-methyl-6-diethylaminofluorane (Black 15, CAS no.: 36431-22-8), 3-(1,2-dimethyl-3-indolyl)-3-[4-(diethylamino)-2-methylphenyl]phthalide (CAS no. 36499-49-7), 3',6'-dimethoxyfluorane (CAS no.: 36886-76-7), 3,3-bis-(1-butyl-2-methyl-indol-3-yl)-3H-isobenzofuran-1-one (Red 40, CAS no.: 50292-91-6), 3,3-bis-(2-methyl-1-octyl-1H-indol-3-yl)-3H-isobenzofuran-1-one (CAS no.: 50292-95-0), 2'-anilino-6'-[ethyl(p-tolyl)amino]-3'-methylspiro[isobenzofuran-1(3H),9'-[9H]xanthene]-3-one (CAS no.: 59129-79-2), 3-(4-diethylamino-2-ethoxyphenyl)-3-(1-ethyl-2-methylindol-3-yl)-4-azaphthalide (CAS no.: 69898-40-0), 3-(N-ethyl-n-isopentylamino)-6-methyl-7-anilino fluorine (CAS no.: 70516-41-5), 3-[4-(diethylamino)phenyl]-3-(1-ethyl-2-methyl-1H-indol-3-yl)phthalide (CAS no.: 75805-17-3), 2'-(2-chloroanilino)-6'-(dibutylamino) fluorine (CAS no.: 82137-81-3), 2-phenylamino-3-methyl-6-dibutylaminofluorane (CAS no.: 89331-94-2), 3-(1-butyl-2-methyl-1H-indol-3-yl)-6-(dimethylamino)-3-[4-(dimethylamino)phenyl]-3-1(3H)-isobenzofuranone (CAS no.: 92453-31-1), 7-(4-diethylamino-2-hexyloxyphenyl)-7-(1-ethyl-2-methyl-1H-indol-3-yl)-7H-furo[3,4-b]pyridin-5-one (Blue 203, CAS no.: 98660-18-5), 7,7-bis[4-(diethylamino)-2-ethoxyphenyl]furo[3,4-b]pyridin-5-one (CAS no.: 132467-74-4), N,N-dimethyl-4-[2-[2-(oxtyloxy)phenyl]-6-phenyl-4-pyridinyl]benzenamine (Yellow CK37, CAS no.:

144190-25-0), 3-(2,2-bis(1-ethyl-2-methylindol-3-yl)vinyl)-3-(4-diethylaminophenyl)-phthalide (CAS no.: 148716-90-9).

Preferably, the electron-donor organic dye compound (A) is chosen from among 3-(4-diethylamino-2-ethoxyphenyl)-3-(1-ethyl-2-methylindol-3-yl)-4-azaphthalide (Blue 63, CAS no.: 69898-40-4), 2'-(dibenzylamino)-6'-(diethylamino)fluorane (CAS no.: 34372-72-0), N,N-dimethyl-4-[2-[2-(oxtyloxy)phenyl]-6-phenyl-4-pyridinyl]benzenamine (Yellow CK37, CAS no.: 144190-25-0), 7-(4-diethylamino-2-hexyloxyphenyl)-7-(1-ethyl-2-methyl-1H-indol-3-yl)-7H-furo[3,4-b]pyridine-5-one (Blue 203, CAS no.: 98660-18-5), 2-(2,4-dimethylphenylamino)-3-methyl-6-diethylaminofluoran (Black 15, CAS no.: 36431-22-8) and 3,3,-bis-(1-butyl-2-methyl-indol-3-yl)-3H-isobenzofuran-1-one (Red 40, CAS no.: 50292-91-6).

As an electron-acceptor compound (B), a non-limiting list may include compounds having an active proton, such as compounds having a phenolic hydroxyl group (monophenols or polyphenols), their derivatives having substituents such as an alkyl group, an aryl group, an acyl group, an alcoxycarbonyl group, a carboxy group, esters of these, an amido group or a halogen atom, and condensed phenolaldehyde resins such as bisphenols or trisphenols.

The following definitions are provided in the sense of the present disclosure:

Alkyl: a saturated aliphatic hydrocarbon group, linear or ramified, in $C_1$-$C_{20}$, preferably $C_1$-$C_{12}$ and even more preferably in $C_1$-$C_6$. The term "ramified" means that at least one inner alkyl group such as a methyl or an ethyl is carried by a linear alkyl chain. As an example of an alkyl group, the methyl, ethyl, n-propyl, I-propyl, n-butyl, t-butyl and n-pentyl groups can be mentioned, for example.

Aryl: any functional or substituent group derived from at least one aromatic cycle; an aromatic cycle corresponds to any flat mono or polycyclic group comprising a delocalized π system in which each atom of the cycle comprises an orbital p, said orbitals p covering one another; among such aryl groups, the phenyl, biphenyl, naphthalene and anthracene groups can be mentioned. The aryl groups according to the disclosure preferably comprise 4 to 12 carbon atoms, and even more preferably 5 to 6 carbon atoms. Even more preferably, the aryl group according to the disclosure is a phenyl group.

Thus, the electron-acceptor compound (B) may be chosen from among the 2,2-bis(4-hydroxy-3-methylphenyl)propane (Bisphenol C, CAS no.: 79-97-0), 4-hexyl-1,3-dihydroxybenzene (4-hexylresorcinol, CAS no.: 136-77-6), 4,4'-cyclohexylidenebisphenol (BZP, CAS no.: 843-55-0), 4,4'-(hexafluoroisopropylidene)diphenol (Bisphenol AF, CAS no.: 1478-61-1), 4,4'-(1-phenylethylidene)bisphenol (CAS no.: 1571-75-1), 2,2'-dihydroxybiphenyl (CAS no.: 1806-29-7), 4,4'-ethylidenebisphenol (CAS no.: 2081-08-5), 4,4'-(1,4-phenylenediisopropylidene)bisphenol (CAS no.: 2167-51-3), 1,1-bis(4-hydroxy-3-methylphenyl)cyclohexane (CAS no.: 2362-14-3), 9,9-bis(4-hydroxyphenyl)fluorine (CAS no.: 3236-71-3), 4,4'-(1,3-phenylenediisopropylidene)bisphenol (CAS no.: 13595-25-0), 1,1,1-tris(4-hydroxyphenyl)ethane (CAS no.: 27955-94-8), 4,4'-(2-ethylhexylidene)diphenol (CAS no.: 74462-02-5), α,α,α'-tris(4-hydroxyphenyl)-1-ethyl-4-isopropylbenzene (CAS no.: 110726-28-8), 4-(1,1,3,3-tetramethylbutyl)phenol (CAS no.: 140-66-9), 4-hydroxydiphenylether (CAS no.: 831-82-3), bis(2-hydroxy-1-naphthyl)methane (CAS no.: 1096-84-0), 4-(methylsulfonyl)phenol (CAS no.: 14763-60-1), 4-hydroxyphenyl-4'-isopropoxyphenyl sulfone (CAS no.: 95235-30-6), 4,4'-dihydroxybiphenyl (CAS no.: 92-88-6), 4-hydroxybiphenyl (CAS no.: 92-69-3), p-hydroxycumene (CAS no.: 99-89-8), 2,4-dihydroxybenzophenone (CAS no.: 131-56-6), hydroquinone monomethyl ether (MEHQ, CAS no.: 150-76-5), 3-n-pentadecylphenol (CAS no.: 501-24-6), 4-(2-phenylisopropyl)phenol (CAS no.: 599-64-4), 5-chloro-2-(2,4-dichlorophenoxy)phenol (CAS no.: 3380-34-5), N-(p-toluenesulfonyl)-N'-(3-(p-toluenesulfonyloxy)phenyl)urea (CAS no.: 232938-43-1), 2,2-bis(3,5-dibromo-4-hydroxyphenyl)propane (CAS no.: 79-94-7), 4,4'-isopropylidenediphenol (CAS no.: 80-05-7) and 4,4'-sulfonyldiphenol (BPS, CAS no.: 80-09-1).

Preferably, the electron-acceptor compound (B) is chosen from among 2,2-bis(4-hydroxy-3-methylphenyl)propane (Bisphenol C, CAS no.: 79-97-0), 4-hexyl-1,3-dihydroxybenzene (4-hexylresorcinol, CAS no.: 136-77-6), 4,4'-cyclohexylidenebisphenol (BZP, CAS no.: 843-55-0), 4,4'-(hexafluoroisopropylidene)diphenol (Bisphenol AF, CAS no.: 1478-61-1), 4,4'-(1-phenylethylidene)bisphenol (CAS no.: 1571-75-1), 2,2'-dihydroxybiphenyl (CAS no.: 1806-29-7), 4,4'-(1,4-phenylenediisopropylidene)bisphenol (CAS no.: 2167-51-3), 1,1-bis(4-hydroxy-3-methylphenyl)cyclohexane (CAS no.: 2362-14-3), 9,9-bis(4-hydroxyphenyl)fluorine (CAS no.: 3236-71-3), 4,4'-(1,3-phenylenediisopropylidene)bisphenol (CAS no.: 13595-25-0), 1,1,1-tris(4-hydroxyphenyl)ethane (CAS no.: 27955-94-8), 4,4'-(2-ethylhexylidene)diphenol (CAS no.: 74462-02-5), and α,α,α'-tris(4-hydroxyphenyl)-1-ethyl-4-isopropylbenzene (CAS no.: 110726-28-8).

The thermochromic pigment composition according to the disclosure is prepared by dissolving compounds (A) and (B) in compound (C) of formula (I) as defined above, then agitating the same until a homogeneous mixture is obtained with the help of an agitator such as a homo mixer or a disperser.

Compounds (A) and (B) thus associated with compound (C) of formula (I) as defined above can be formulated in the shape of microcapsules. The thermochromic pigment composition according to the disclosure is thereby encapsulated in microcapsules to form microencapsulated thermochromic pigments. Such microencapsulated thermochromic pigments constitute another object according to the disclosure. The microencapsulated thermochromic pigments are advantageous in that they are resistant to mechanical constraints, insoluble and thus dispersible in water and present slow agglomeration.

The fusion temperature (or decoloration temperature T4) of the microencapsulated thermochromic pigments according to the disclosure may vary from 20 to 80° C., preferably from 30 to 80° C. and even more preferably from 40 to 70° C.

The crystallization temperature (or recoloration temperature T1) of the microencapsulated thermochromic pigments according to the disclosure may vary from −40 to 20° C., preferably from −30 to 10° C. and even more preferably from −20 to 0° C.

The microcapsules comprising the thermochromic pigment composition according to the disclosure present an average diameter that may range from 0.5 to 30 μm, preferably from 1 to 10 μm and even more preferably from 3-5 μm. This average diameter corresponds to the D90 in volume and means that 90% by volume of the microcapsules are smaller than the indicated value of D90. This average diameter can be determined by a granulometry laser using a Malvern Zetasizer Nano ZS system.

The microencapsulation processes used include, but are not limited to, conventional methods such as:
- chemical processes based on the in situ formation of the coating microcapsules, e.g. through polymerization or interfacial polycondensation, these processes being preferred,
- physicochemical processes, e.g. phase separation coacervation, solvent evaporation-extraction, thermally-induced gelation of emulsions (hot melt), or
- mechanical processes, e.g. nebulization/drying (spray drying), gelation or congelation of drops, fluidized bed coating (spray-coating).

The microcapsules comprising the thermochromic pigment composition according to the disclosure are made with an aminoplast resin base, and preferably a melamine resin, urea resin or benzoguanamine resin base.

The microcapsules comprising the thermochromic pigment composition according to the disclosure are preferably prepared through in situ polymerization with a melamine resin.

Another technical objective of the disclosure relates to an ink composition comprising microencapsulated thermochromic pigments according to the disclosure.

The microencapsulated thermochromic pigments according to the disclosure present within the ink composition represent from 5 to 50% by weight of the total weight of the ink composition.

The ink composition according to the disclosure is furthermore primarily composed of water. Water represents 40 to 80% by weight of the total weight of the ink composition. It may likewise comprise one or more water-miscible co-solvents. Thus, the ink composition according to the disclosure can contain an organic or aqueous solvent, preferably an aqueous solvent. The ink composition according to the disclosure may likewise contain one or more specific adjuvants that may play different roles according to the final intended application. These applications may relate to ink printing through serigraphy, offset printing, rotogravure printing, spray coating, electrostatic coating, electrodepositable coating, roll coating, inkjet printing and ink for writing tools such as ballpoint pens, fude pens, markers and colored pencils. The ink composition according to the disclosure may also be added to a thermoplastic or thermosetting resin composition to form molds.

Among the solvents that may be added to the ink composition according to the disclosure, we can cite water and the polar water-miscible solvents, such as:
- alcohols: linear or ramified alcohols in $C_1$-$C_{15}$, e.g. isopropanol, butanol, isobutanol, pentanol, benzyl alcohol; glycerine; diglycerine; polyglycerine.
- esters, e.g. ethyl acetate or propyl acetate,
- carbonate esters, e.g. propylene carbonate or ethylene carbonate,
- ketones, e.g. methyl isobutyl ketone (MIBK), acetone or cyclohexanone,
- glycols, e.g. ethylene glycol, diethylene glycol, triethylene glycol, propylene glycol, polyethylene glycol, ethylene glycol monomethyl ether, 3-butylene glycol and thiodiethylene glycol,
- amides, e.g. dimethylacetamide or dimethylformamide, and
- mixtures thereof.

The solvent or solvents represent from 5 to 20% by weight of the total weight of the ink composition.

Among the adjuvants mentioned above, we can cite:
- rheology modifiers (shear-thinning agents) capable of generating a gelling effect, e.g. xanthan gum or gum Arabic,
- defoamers, e.g. modified aqueous dispersions of polysiloxane (MOUSSEX® from Synthron),
- pH regulators, e.g. sodium hydroxide, triethanolamine,
- surfactants, e.g. polyether polyols (TERGITOL® from DOW),
- biocides, e.g. isothiazolinones (ACTICIDE® from Thor),
- corrosion inhibitors, e.g. benzotriazole,
- lubricants,
- dispersants,
- coalescing agents,
- crosslinking agents,
- wetting agents,
- plasticizers,
- antioxidants,
- UV stabilizers.

An additional technical objective of the disclosure relates to writing instruments comprising an ink composition according to the disclosure. These instruments are generally made up of a body comprising the ink composition according to the disclosure, and possibly a friction element. The writing instrument according to the disclosure is chosen from among ballpoint pens, pencils, chalks, and ballpoint pens with friction-erasable ink. The friction element of the writing instrument is preferably an eraser.

The media on which the ink composition according to the disclosure can be applied are paper, fibers, leather, plastic, glass, metal, wood and concrete.

In addition to the preceding provisions, the disclosure comprises further provisions that will result from the description complement to follow, which relates to the use of compounds of formula (I) according to the disclosure as a temperature change regulating agent in thermochromic pigment compositions according to the disclosure and their characterization.

EXAMPLES

Example 1

Preparation of a Thermochromic Pigment Composition:

A thermochromic pigment composition is prepared by mixing 2.2 parts by weight of 3-(4-diethylamino-2-ethoxyphenyl)-3-(1-ethyl-2-methylindol-3-yl)-4-azaphthalide (compound (A), CAS no.: 69898-40-4), 2.2 parts by weight of 4,4'-(hexafluoroisopropylidene)diphenol (compound (B1) CAS no.: 1478-61-1), 2.2 parts by weight of 2,2-bis(4-hydroxy-3-methylphenyl)propane (compound (B2), CAS no.: 79-97-0) and 93.3 parts by weight of a compound of formula (I) according to the disclosure (compound (1)) (compound (C)):

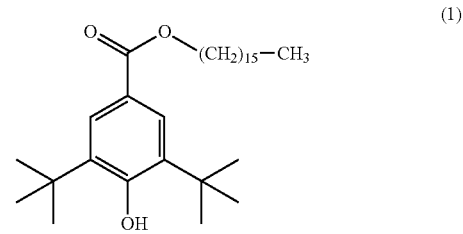

The mixture obtained is heated, under agitation, to a temperature of 110° C. for 1 hour, until the compounds (A), (B1) and (B2) have been completely solubilized into the compound (C).

Preparation of a Microencapsulated Thermochromic Pigment:

7.2 parts by weight of an aqueous solution of a copolymer of a maleic anhydride and methyl vinyl ether (33% solution by weight of the copolymer) are neutralized with 8.8 parts by weight of an aqueous solution of sodium hydroxide (1.0 M solution). This solution is diluted with 38.4 parts by weight of water, and the mixture emulsified with a homogenizer at a speed of at least 15 m·s$^{-1}$. 27.8 parts by weight of the thermochromic pigment composition prepared before are added, and the emulsion obtained is kept at a temperature of 80° C. for 30 minutes. 17.8 parts by weight of a melamine-formaldehyde pre-polymer (50% aqueous solution by weight of the pre-polymer) are then added dropwise to the mixture. The reaction medium is then heated to a temperature of 90° C. and mixed at a speed of at least 15 m·s$^{-1}$ for 4 hours.

A slurry made up of thermochromic pigment microcapsules dispersed in an aqueous solvent is obtained, the microcapsules having a D90 diameter of 3.6 μm, determined using a Malvern Zetasizer Nano ZS system with an illumination of 632 nm.

The thermochromic pigment microcapsules obtained have the property of changing colors from blue to colorless beyond 62° C. with a color hysteresis effect.

Preparation of an Ink Composition:

10.5 parts by weight of glycerin (co-solvent) are heated to a temperature of 30° C., under agitation with a blade. 0.2 parts by weight of benzotriazole (corrosion inhibitor) and 0.2 parts by weight of an aqueous solution comprising 2.5% by weight of 1,2-benzisothiazolin-3-one and 2.5% by weight of 2-methyl-4-isothiazolin-3-one (biocide) are then added. The mixture is agitated until the additives have been completely solubilized. 0.5 parts by weight of xanthan gum (rheology modifier) are added slowly over 15 minutes. After dispersion of the rheology modifier, 28.6 parts by weight of distilled water are added. The ink composition obtained is kept under agitation for 3 hours, then 60 parts by weight of an aqueous dispersion of microencapsulated thermochromic pigment prepared above (30% aqueous solution by weight of microencapsulated thermochromic pigment) are added. The blue ink is then dispersed with a disperser at a speed of at least 15 m·s$^{-1}$ for 30 minutes. The ink composition is vented under reduced pressure before injecting into ink cartridges.

Example 2

Preparation of a Thermochromic Pigment Composition:

A thermochromic pigment composition is prepared by mixing 2.2 parts by weight of 3-(4-diethylamino-2-ethoxyphenyl)-3-(1-ethyl-2-methylindol-3-yl)-4-azaphthalide (compound (A), CAS no.: 69898-40-4), 2.1 parts by weight of 2,2-bis(4-hydroxy-3-methylphenyl)propane (compound (B1), CAS no.: 79-97-0), 2.1 parts by weight of 4,4'-(1,3-phenylenediisopropylidene)bisphenol (compound (B2), CAS no.: 13595-25-0) and 93.8 parts by weight of a compound of formula (I) according to the disclosure (compound (2)) (compound (C)):

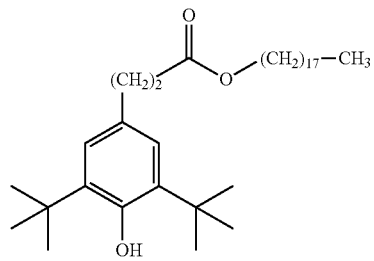

(2)

The mixture obtained is heated, under agitation, to a temperature of 110° C. for 1 hour, until compounds (A), (B1) and (B2) have been completely solubilized into the compound (C).

Preparation of a Microencapsulated Thermochromic Pigment:

7.4 parts by weight of an aqueous solution of a copolymer of a maleic anhydride and methyl vinyl ether (33% solution by weight of the copolymer) are neutralized with 10.2 parts by weight of an aqueous solution of sodium hydroxide (1.0 M solution). This solution is diluted with 40.3 parts by weight of water, and the mixture emulsified with a homogenizer at a speed of at least 15 m·s$^{-1}$. 25.3 parts by weight of the thermochromic pigment composition prepared before are added, and the emulsion obtained is kept at a temperature of 80° C. for 30 minutes. 16.8 parts by weight of a melamine-formaldehyde pre-polymer (50% aqueous solution by weight of the pre-polymer) are then added dropwise to the mixture. The reaction medium is then heated to a temperature of 90° C. and mixed at a speed of at least 15 m·s$^{-1}$ for 4 hours.

A slurry made up of thermochromic pigment microcapsules dispersed in an aqueous solvent is obtained, the microcapsules having a D90 diameter of 3.9 μm, determined using a Malvern Zetasizer Nano ZS system with an illumination of 632 nm.

The thermochromic pigment microcapsules obtained have the property of changing colors from blue to colorless beyond 55° C. with a color hysteresis effect.

Preparation of an Ink Composition:

10.6 parts by weight of glycerin (co-solvent) are heated to a temperature of 30° C., under agitation with a blade. 0.2 parts by weight of benzotriazole (corrosion inhibitor) and 0.2 parts by weight of an aqueous solution comprising 2.5% by weight of 1,2-benzisothiazolin-3-one and 2.5% by weight of 2-methyl-4-isothiazolin-3-one (biocide), 0.5 parts by weight of an aqueous solution of a polysiloxane copolymer (50% aqueous solution by weight of polymer) (defoamer), and 0.5 parts by weight of a polyol polyether (surfactant) are then added. The mixture is agitated until the additives have been completely solubilized. 0.5 parts by weight of xanthan gum (rheology modifier) are added slowly over 15 minutes. After dispersion of the rheology modifier, 27.0 parts by weight of distilled water are added. The ink composition obtained is kept under agitation for 3 hours, then 60 parts by weight of an aqueous dispersion of microencapsulated thermochromic pigment prepared above (30% aqueous solution by weight of microencapsulated thermochromic pigment) are added. The pH of the ink composition is adjusted to pH=8 with 0.5 parts by weight of triethanolamine. The blue ink is then dispersed with a disperser at a speed of at least 15 m·s$^{-1}$ for 30 minutes. The ink composition is vented under reduced pressure before injecting into ink cartridges.

Determination of the Decoloration and Recoloration Temperatures of the Thermochromic Pigment Microcapsules Prepared in Examples 1 and 2:

The transition temperatures of the thermochromic pigment microcapsules obtained are measured using differential scanning calorimetry (DSC) with a TA Instruments Q20 device, for a temperature range from −50 to 100° C., at cooling/heating speeds of 20° C./minute. The temperatures measured are indicated in Table 1 below.

TABLE 1

Transition temperatures of the thermochromic pigment microcapsules according to Example 1

| | Color change colored ←→ colorless | T1 (° C.) | T2 (° C.) | T3 (° C.) | T4 (° C.) | $T_H$ (° C.) | $T_G$ (° C.) | ΔH |
|---|---|---|---|---|---|---|---|---|
| Thermochromic pigment capsules from Example 1 | blue ←→ colorless | −10 | 4 | 50 | 62 | −3 | 56 | 59 |
| Thermochromic pigment capsules from Example 2 | blue ←→ colorless | −5 | 4 | 37 | 52 | 0 | 45 | 45 |

The transition temperatures measured are as follows:
T1: complete recoloration temperature,
T2: partial recoloration temperature,
T3: partial decoloration temperature,
T4: complete decoloration temperature, $$T_H = \frac{(T1 + T2)}{2}$$

$$T_G = \frac{(T3 + T4)}{2}$$

ΔH = hysteresis range = $T_G - T_H$

Example 3

Several thermochromic pigment compositions according to the disclosure have been tested to determine the optimal ratios of compounds (A), (B) and (C) necessary for complete decoloration of the compositions.

The thermochromic pigment compositions are prepared by mixing the compounds (A), (B) and (C) under agitation at a temperature of 110° C. for 1 hour until compounds (A) and (B) have been completely solubilized into the compound (C).

The formulas of the different thermochromic pigment compositions 1-9 tested appear in Table 2 below:

TABLE 2

Formulas of the different thermochromic pigment compositions tested

| | % by weight | | |
|---|---|---|---|
| Compositions | Compound (A) | Compound (B) | Compound (C) = Compound (1) |
| 1 | 2.4 | 5.1 | 92.5 |
| 2 | 4.1 | 4.1 | 91.9 |
| 3 | 2.8 | 5.5 | 91.7 |
| 4 | 7.6 | 2.0 | 90.4 |
| 5 | 1.9 | 8.2 | 89.9 |
| 6 | 4.5 | 8.6 | 86.9 |
| 7 | 16.5 | 5.3 | 78.3 |
| 8 | 24.0 | 6.3 | 69.8 |
| 9 | 0.7 | 1.5 | 97.9 |

The thermochromic effect of the different thermochromic pigment compositions prepared is evaluated visually by increasing the temperature to 65° C. The results observed are summarized in Table 3 below.

TABLE 3

Thermochromic effect of the different thermochromic pigment compositions 1-9 tested

| Compositions | Visual observations |
|---|---|
| 1 | Totally colorless beyond 65° C. |
| 2 | Totally colorless beyond 65° C. |

TABLE 3-continued

Thermochromic effect of the different thermochromic pigment compositions 1-9 tested

| Compositions | Visual observations |
|---|---|
| 3 | Totally colorless beyond 65° C. |
| 4 | Totally colorless beyond 65° C. |
| 5 | Slightly blue beyond 65° C. |
| 6 | Slightly blue beyond 65° C. |
| 7 | Slightly blue beyond 65° C. |
| 8 | Blue beyond 65° C. |
| 9 | Totally colorless beyond 65° C. |

It can be observed that the more the ratio of compound (1) in the thermochromic pigment composition increases, the more easily the thermochromic pigment compositions are erased and become colorless.

Counter Example 1

A thermochromic pigment composition according to the disclosure comprising a compound of formula (I) according to the disclosure (compound (1)) as compound (C):

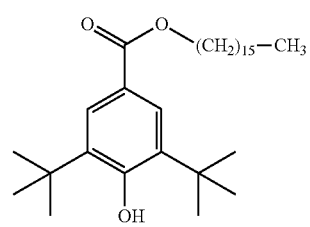

(1)

is compared to a thermochromic pigment composition in which the compound (1) is replaced by dodecyl paraben, a compound with a similar structure, but exempt from —C(CH₃)₃ terbutyl groupings.

The thermochromic pigment compositions are prepared by mixing the compounds (A), (B) and (C), under agitation, at a temperature of 110° C. for 1 hour, until the compounds (A) and (B) have been completely solubilized into the compound (C).

The formulas of the thermochromic pigment compositions appear in Table 4 below.

TABLE 4

Formulas of the compositions with the compound (1) and with dodecyl paraben

|  | Composition according to the disclosure (% by weight) | Comparative composition (% by weight) |
| --- | --- | --- |
| Compound (A): 3-(4-diethylamino-2-ethoxyphenyl)-3-(1-ethyl-methylindol-3-yl)-4-azaphthalide (Blue 63, CAS no.: 69898-40-4) | 2.0 | 2.0 |
| Compound (B): 4,4'-(hexafluoroisopropylidene) diphenol (Bisphenol AF, CAS no.: 1478-61-1) | 5.0 | 5.0 |
| Compound (C): compound (1) | 93.0 | — |
| Compound (C): dodecyl paraben | — | 93.0 |

To test the thermochromic effect, a drop of the thermochromic pigment composition is placed on a microscope slide. The plate is then heated to a temperature greater than the fusion point of the compound (C). A visual observation takes place through the comparison of the intensity of the color when the plate is heated to a temperature greater than the fusion point of the compound (C) with a plate placed at room temperature.

At 20° C., the two compositions comprising the compound (1) and the dodecyl paraben are both colored blue.

At 90° C., the composition according to the disclosure comprising the compound (1) is completely decolored (colorless), while the comparative composition comprising the dodecyl paraben maintains a blue color. In the comparative composition, the dodecyl paraben plays the role of a color developer due to the absence of steric hindrance near the 4-phenol.

The invention claimed is:

1. Thermochromic pigment composition comprising:
(A) at least one electron-donor organic dye compound,
(B) at least one electron-acceptor compound, and
(C) at least one compound serving as a reaction medium capable of bringing about a reversible electron-acceptance/donation reaction attributable to compounds (A) and (B), the at least one compound including:

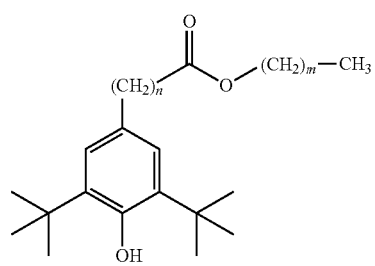

(I)

wherein:
n=0-2, and
m=5-19
wherein the thermochromic pigment composition has
(A) from 1 to 10% by weight of the at least one electron-donor organic dye compound,
(B) from 1 to 20% by weight of the at least one electron-acceptor compound, and
(C) from 70 to 98% by weight of the at least one compound including formula (I) based on the total weight of the thermochromic pigment composition.

2. The thermochromic pigment composition according to claim 1, wherein a compound of formula (I) is chosen from one of the following compounds:

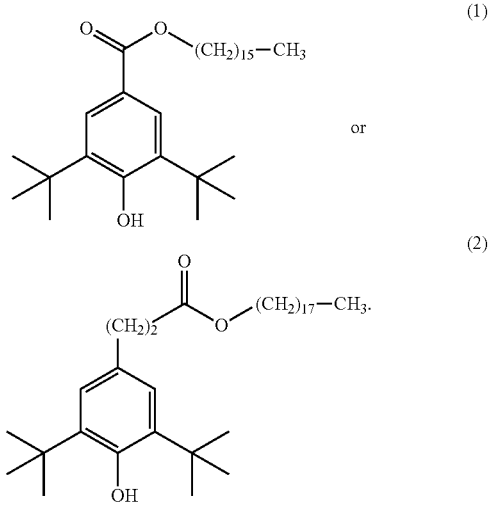

3. The thermochromic pigment composition according to claim 1, comprising:
(A) from 2 to 4% by weight of the at least one electron-donor organic dye compound,
(B) from 4 to 10% by weight of the at least one electron-acceptor compound, and
(C) from 86 to 94% by weight of the at least one compound including formula (I) based on the total weight of the thermochromic pigment composition.

4. The thermochromic pigment composition according to claim 1, wherein the electron-donor organic dye is selected from the group consisting of 3-(4-diethylamino-2-ethoxyphenyl)-3-(1-ethyl-2-methylindol-3-yl)-4-azaphthalide (Blue 63), 2'-(dibenzylamino)-6'-(diethylamino) fluorane, N,N-dimethyl-4-[2-[2-(octyloxy)phenyl]-6-phenyl-4-pyridinyl]benzenamine (Yellow CK37), 7-(4-diethylamino-2-hexyloxyphenyl)-7-(1-ethyl-2-methyl-1H-indol-3-yl)-7H-furo[3,4-b]pyridine-5-one (Blue 203), 2-(2,4-dimethylphenylamino)-3-methyl-6-diethylaminofluoran (Black 15) and 3,3,-bis-(1-butyl-2-methyl-indol-3-yl)-3H-isobenzofuran-1-one (Red 40).

5. The thermochromic pigment composition according to claim 1, wherein the electron-acceptor is selected from the group consisting of 2,2-bis(4-hydroxy-3-methylphenyl)propane (Bisphenol C), 4-hexyl-1,3-dihydroxybenzene (4-hexylresorcinol), 4,4'-cyclohexylidenebisphenol (BZP), 4,4'-(hexafluoroisopropylidene) diphenol (Bisphenol AF), 4,4'-(1-phenylethylidene) bisphenol, 2,2'-dihydroxybiphenyl, 4,4'-(1,4-phenylenediisopropylidene) bisphenol, 1,1-bis(4-hydroxy-3-methylphenyl) cyclohexane, 9,9-bis(4-hydroxyphenyl) fluorine, 4,4'-(1,3-phenylenediisopropylidene) bisphenol, 1,1,1-tris(4-hydroxyphenyl) ethane, 4,4'-(2-ethylhexylidene) diphenol, and α,α,α'-tris(4-hydroxyphenyl)-1-ethyl-4-isopropylbenzene.

6. A microencapsulated thermochromic pigment comprising a composition according to claim 1.

7. An ink composition comprising the microencapsulated thermochromic pigment according to claim 6.

8. A writing instrument comprising an ink composition according to claim 7.

9. The writing instrument according to claim 8, wherein the writing instrument is selected from the group consisting of pens, friction-erasable ink pens, ballpoint pens, pencils, and chalks.

10. The writing instrument according to claim 9, wherein the writing instrument includes a friction element.

11. The writing instrument according to claim 9, wherein the writing instrument includes an eraser.

12. A method of writing, comprising contacting a writing instrument including the microencapsulated thermochromic pigment composition of claim 6 with a media.

13. A method of writing, comprising contacting a writing instrument including the thermochromic pigment composition of claim 1 with a media.

14. Thermochromic pigment composition comprising:
(A) at least one electron-donor organic dye compound,
(B) at least one electron-acceptor compound, and
(C) at least one compound including:

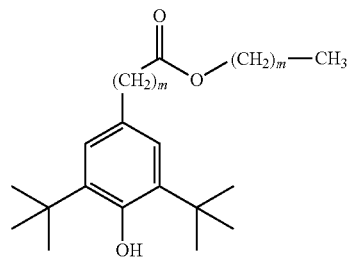

(I)

wherein:
n=0-2,
m=5-19,
wherein when m=17, n≠2.

15. Thermochromic pigment composition comprising:
(A) at least one electron-donor organic dye compound,
(B) at least one electron-acceptor compound, and
(C) at least one compound including:

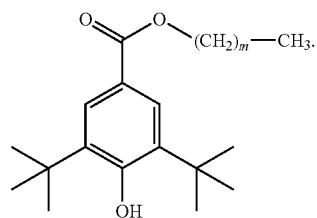

1

16. A method for making a thermochromic pigment composition, comprising: admixing
(A) at least one electron-donor organic dye compound,
(B) at least one electron-acceptor compound, and
(C) at least one compound serving as a reaction medium capable of bringing about a reversible electron-acceptance/donation reaction attributable to compounds (A) and (B), the at least one compound including:

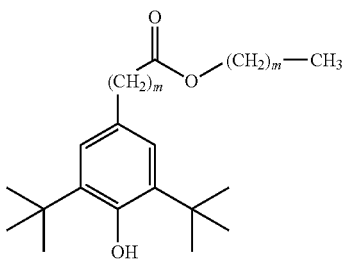

(I)

wherein:
n=0-2, and
m=5-19.

* * * * *